United States Patent
Wang et al.

(10) Patent No.: US 12,083,730 B2
(45) Date of Patent: Sep. 10, 2024

(54) ROTATION EXTRUSION PROCESSING RHEOMETER AND RHEOLOGICAL MEASURING METHOD CAPABLE OF SIMULTANEOUSLY MEASURING PRESSURE/SHEAR RHEOLOGY OF POLYMERS

(71) Applicant: SICHUAN UNIVERSITY, Sichuan (CN)

(72) Inventors: Qi Wang, Sichuan (CN); Min Nie, Sichuan (CN); Lin Pi, Sichuan (CN); Yijun Li, Sichuan (CN); Shibing Bai, Sichuan (CN)

(73) Assignee: SICHUAN UNIVERSITY, Sichuan (CN)

( * ) Notice: Subject to any disclaimer, the term of this patent is extended or adjusted under 35 U.S.C. 154(b) by 863 days.

(21) Appl. No.: 17/044,101

(22) PCT Filed: Nov. 22, 2018

(86) PCT No.: PCT/CN2018/116972
§ 371 (c)(1),
(2) Date: Sep. 30, 2020

(87) PCT Pub. No.: WO2019/184403
PCT Pub. Date: Oct. 3, 2019

(65) Prior Publication Data
US 2021/0146592 A1    May 20, 2021

(30) Foreign Application Priority Data
Mar. 30, 2018   (CN) .......................... 201810288570.3

(51) Int. Cl.
*B29C 48/92* (2019.01)
*G01N 11/08* (2006.01)

(52) U.S. Cl.
CPC .............. *B29C 48/92* (2019.02); *G01N 11/08* (2013.01); *B29C 2948/92019* (2019.02); *B29C 2948/92038* (2019.02); *B29C 2948/922* (2019.02)

(58) Field of Classification Search
CPC ........... B29C 2948/92019; B29C 2948/92038; B29C 2948/922
See application file for complete search history.

(56) References Cited

U.S. PATENT DOCUMENTS 4,213,747 A * 7/1980 Friedrich ................ B29B 7/728
                                                   425/146
4,500,481 A * 2/1985 Marx, III ................ B29C 48/92
                                                   264/68

(Continued)

FOREIGN PATENT DOCUMENTS

CN           2464532 Y       12/2001
CN           1773245 A       5/2006
(Continued)

OTHER PUBLICATIONS

M.A. Couch et al.; High pressure capillary rheometry of polymeric fluids; Polymer, 2000, 41 (16): 6323-6334.
(Continued)

*Primary Examiner* — Seyed Masoud Malekzadeh
(74) *Attorney, Agent, or Firm* — NKL Law; Allen Xue (57) ABSTRACT

A rotating extrusion rheometer includes a control monitoring mechanism, a melt extrusion mechanism, a rotating extrusion rheology machine head, a sensor, a drive chain wheel, a coupler and an electric motor. The control monitoring mechanism, the melt extrusion mechanism, the rotating extrusion rheology machine head are sequentially connected. The rotating extrusion rheology machine head is formed by a connecting pipe (1), a flow dividing support (3), a lower machine neck (12), a machine head piece (15), an (Continued)

opening mold (17), an opening-mold driving chain wheel (20), a core bar (21) and a core-bar driving mechanism. The rheology measurement method comprises the steps where some parameter values of the rheometer are collected first, and then the rheological behaviors of the polymer melt in the rotating extrusion process are obtained by performing calculation by means of using the derived formula.

8 Claims, 5 Drawing Sheets

(56) References Cited

U.S. PATENT DOCUMENTS

| | | | | |
|---|---|---|---|---|
| 5,347,852 | A * | 9/1994 | Mode | G01N 11/08 |
| | | | | 73/54.04 |
| 5,362,146 | A * | 11/1994 | Nogossek | B29C 48/92 |
| | | | | 366/85 |
| 6,129,450 | A * | 10/2000 | Braun | B29B 7/726 |
| | | | | 366/140 |
| 2005/0235741 | A1 * | 10/2005 | Colaco Covas | G01N 11/165 |
| | | | | 73/54.28 |
| 2019/0009466 | A1 * | 1/2019 | Li | B29C 64/112 |
| 2019/0009467 | A1 * | 1/2019 | Li | B05B 7/0408 |
| 2019/0216591 | A1 * | 7/2019 | Li | A61L 27/507 |
| 2019/0217537 | A1 * | 7/2019 | Li | B33Y 10/00 |

FOREIGN PATENT DOCUMENTS

| | | |
|---|---|---|
| CN | 103154699 A | 6/2013 |
| CN | 104833613 A | 8/2015 |
| CN | 204649571 U | 9/2015 |
| CN | 108709828 A | 10/2018 |
| CN | 208443691 U | 1/2019 |
| GB | 2422327 A | 7/2006 |

OTHER PUBLICATIONS

Sui, Changping et al.; Instability of entangled polymers in cone and plate rheometry; Rheologica Acta, 2007, 46(6), 877-888.

* cited by examiner

ROTATION EXTRUSION PROCESSING RHEOMETER AND RHEOLOGICAL MEASURING METHOD CAPABLE OF SIMULTANEOUSLY MEASURING PRESSURE/SHEAR RHEOLOGY OF POLYMERS

TECHNICAL FIELD

The invention belongs to the technical field of polymer rheology testing and processing devices, and particularly relates to a rheological measurement method accompanying with simultaneously monitoring pressure/shear rheology of polymers by rotation extrusion processing rheometer.

BACKGROUND TECHNIQUE

Most polymers need to be processed and molded before use. However, the orientation structure, crystalline structure and final product structure of the polymer will change under different processing temperature fields and stress fields, which will affect the appearance and quality of the product. Therefore, the rheological behavior of polymers, the formation and definition of multi-level and multi-scale structures, and the study of mechanisms under the complex conditions of actual processing have always been the core basic scientific issues that need to be studied in the field of polymer processing technology, and the solution is to design advanced scientific instruments to cooperate. In order to study the rheological behavior of polymers, a variety of rheometers have been developed and disclosed, of which the most commonly used are extrusion rheometers and rotary rheometers:

(1) High-pressure capillary rheometer: The high-pressure capillary rheometer is a rheological measuring equipment that extrude polymers out of the die under constant speed or constant pressure to study the pressure flowing behavior of polymers in circular tube and measure the shearing viscosity of polymers under high shear rate (Couch M. A., Binding D. M., Polymer, 2000, 41 (16): 6323-6334.). The capillary rheometer is currently the most mature extrusion rheometer for studying the rheological behavior of polymers. Unfortunately, its measurement principle is based on the one-dimensional pressure flow of the melt, which cannot reflect the actual processing of polymers under complex conditions, as a consequence, the guidance for polymer processing is limited to a single extrusion behavior.

2) Flat plate rheometer: The flat plate rheometer relies on the rotation of the parallel plate to generate simple shear, so that a drag flow of polymer melt is produced between two parallel plates. The torque of the melt on the fixed plate can be measured by the sensor. Then, the rheological curve of the melt is calculated by parameters such as the radius and rotary speed of the plate. Although the flat plate rheometer is also one of the most commonly used rotating rheological measuring instruments in rheological measurement, and the speed of the plate can be controlled in a very slow range thus often used to determine the polymer force difference at low shear rates (Sui C. P., McKenna G. B., Rheologica. Acta, 2007, 46(6), 877-888.), its measurement principle is based on θ-azimuth drag flow, the guidance for polymer processing is limited to a single shear behavior as well, and the melt is in an open condition when flat plate is driving the melt. Thus, when the rotor speed increases to a high level, the edge of the melt will break, which has a great impact on the measurement results.

In view of the fact that a more practical polymer processing theology measurement device not only needs to measure the rheological parameters of the polymer melt under specific conditions, but the measured parameter values also need to reflect the rheological behaviors of polymers in actual processing process as accurately as possible. Therefore, it is possible to provide theoretical guidance for the actual processing of polymers. In the polymer molding process, when it is subjected to the three-dimensional compound force field of the axial pressure flow force field and the hoop drag shear force field. Obviously, for the above-mentioned rheometer based on a single model such as high-pressure capillary rheometer and flat rheometer, the practical guidance for polymer processing is extremely limited.

SUMMARY OF THE INVENTION in order to solve the technical issues above, the present invention provides a rotation extrusion processing rheometer and rheological measuring method capable of simultaneously measuring pressure/shear rheology of polymers. The rheometer can simultaneously measure the rheological parameters under complex pressure/shear composite force field and temperature field of polymers, providing theoretical guidance for the preparation process of polymers, especially polymer pipes, and prepare high-performance polymer microtubes under the pressure/shear composite force field and temperature field.

In order to solve the above technical issues, a technical solution adopted by the present invention is to provide a rotation extrusion processing rheometer capable of simultaneously measuring pressure/shear rheology of polymers, and the processing rheometer includes successively connected melt extrusion mechanism, rotation extrusion rheological head, as well as sensors, transmission sprocket, coupling, motor and control and monitoring mechanism. The characteristic is that, the rotation extrusion rheological head above is composed of the connecting pipe fitting (1), the shunt bracket (3), the lower neck section (12), the machine head piece (15), the die (17), the opening mold driving sprocket (20), the mandrel (21) and the mandrel driving mechanism. The connecting pipe fitting (1), the shunt bracket (3) and the machine head piece (15) are connected as a whole through connecting piece in turn. The lower neck section (12) is located in the cavity between the shunt bracket (3) and the machine head piece (15). The die (17) is active fixed in the cavity at back end of the machine head piece (15), and is connected to opening mold driving sprocket (20) outside the end face of the machine head piece (15). The mandrel (21) is located in the inner channel of the lower neck section (12), machine head piece (15) and die (17), one end is connected to the mandrel driving mechanism in shunt bracket (3). The sensors are divided into pressure sensors and torque sensors, and the pressure sensors are placed in stepped through hole (16) on the side of machine head piece (15), The torque sensor is installed on the coupling between the transmission sprocket and the motor, and both are connected with the control and monitoring mechanism.

Preferably, the cross-section of connecting pipe fitting (1) is an inverted "convex" shape, both left and right ends of which are flange plates, and a melt feeding through hole (2) is opened in the middle of left end surface which is connected to the melt extrusion mechanism. The rear half of melt feeding through hole (2) is a horn shaped open cavity to match the inverted conical protrusion at end of the shunt bracket (3).

Preferably, the front section of the shunt bracket (3) frame is an inverted cone-shaped protrusion, and there is a flange plate shaped by extending outward along the bottom edge of the inverted cone-shaped protrusion. The flange plate is matched and connected with the connecting pipe fitting and machine head piece. One side of the frame between the two flange plates extends downward and forms a column (4). The outer diameter of the rear frame is smaller than the outer diameter of the middle frame and is matched with the inner diameter of the stepped through hole at front end of the lower neck section (12). The outer surface of the inverted cone-shaped protrusion is provided with an arc groove-shaped melt flow channel (5), and there is a convex reinforce (6) between every two arc groove-shaped melt flow channels (5). A stepped blind hole (7) is opened horizontally in the middle and rear sections of the shunt bracket (3), and a stepped through hole (4) is opened in the column (4) below the middle section of the shunt bracket (3). The stepped through hole (8) is vertically connected to the blind end of the stepped blind hole (7), and the other end is sealed by a cover plate (9) with hole. There is also a vent hole (10) on the middle frame of the raised reinforce (6) on the upper side and the vent hole (10) is also connected to the blind end of the stepped blind hole (7).

Preferably, the shape of lower neck section (12) is like a columnar cone with a stepped through hole in it.

Preferably, the machine head piece (15) is a column whose end is a flange plate connecting to the shunt bracket (3). There is a columnar funnel-shaped open cavity along the axial direction in the front and middle section of the column, and a stepped through hole (16) is vertically opened on the column on the side of starting end of the funnel cavity nozzle. There is a columnar open cavity along the axial direction of the column at the back section of the stepped through hole (16). The bottom of the cavity is provided with a convex cone, and the axial through hole in the cone is an extension of the funnel-shaped cavity nozzle.

Preferably, the die (17) is an inverted "T"-shaped cylinder with a "T"-shaped stepped through hole in it along the axial direction, and the stepped through hole is active fixed in the columnar open cavity of the machine head piece by the tapered roller bearing (18) and the nut (19).

Preferably, the mandrel (21) is a smooth rod, which is divided into supporting active fixed section and working section. The supporting active fixed section is active supported and fixed by the bearing (13) in the stepped cavity which is formed by the shunt bracket (3) and the lower neck section (12) to make the cantilever of working section locate in the funnel nozzle of machine head piece (15) and stepped through hole (16) of the die (17). The working section is composed of tapered section and straight section with a length ratio of the tapered section to the straight section at least 11:1, and there is an annular groove (22) where the supporting active fixed section and the working section connect. There is also an axial vent (23) along the mandrel (21).

Preferably, the mandrel driving mechanism is composed of the mandrel driving rod (24), the arc gear (25) and the bearing (26). The mandrel driving rod (24) sequentially passes through the stepped through hole and through hole outer cover (9) of the column (4) beneath the middle section frame of shunt bracket (3), and is active supported and fixed by the bearing (26) located in the stepped through hole, so that the upper end is located in the cavity of the middle section of the shunt bracket (3). The lower end is located outside the lower column (4) and connected with the mandrel driving sprocket (27). There are two arc gears (25), one is installed on the end of supporting active fixed section of the mandrel (21) which is located in the cavity of middle section of shunt bracket (3), and the other is engaged with the upper end of the mandrel driving rod (24) located in the cavity of the middle section of the shunt bracket (3).

Preferably, the melt feeding through hole (2) and the mandrel (21) are on the same center line. There are three arc-shaped "concave" groove melt flow channels (5), and the width of the feed end is greater than that of the discharge end. The rheometer is also provided with a cooling box, a tractor and a tube coiler after the rotation extrusion rheological head, so that the extrudate is formed into polymer microtubes.

In order to solve the above technical issues, another technical solution adopted by the present invention is to provide a rheological measuring method capable of simultaneously measuring polymer pressure/shear rheology, and the rheological measuring method includes the following steps:

1) Collect the pressure value ΔP, the torque value of mandrel M2, and the die torque value M1 that are transmitted to the control and monitoring mechanism by the pressure sensor and torque force sensor set by any of the aforementioned rotation extrusion processing rheometers;

2) The axial strain rate $\gamma_{rz}$ is calculated by the following formula:

$$\gamma_{rz} = \frac{2Q}{\pi R^2 \left[1 - \left(\frac{R_i}{R_o}\right)^4\right] - \frac{\left[1 - \left(\frac{R_i}{R_o}\right)^2\right]^2}{\ln\frac{R_o}{R_i}}} \left(-\frac{2r}{R_0^2} + \frac{\left[1 - \left(\frac{R_i}{R_o}\right)^2\right]^2}{\ln\frac{R_o}{R_i}} \frac{1}{r}\right)$$

The axial strain force $\sigma_{rz}$ is calculated by the following formula:

$$\sigma_{rz} = \frac{\Delta P R_o^2}{4L} \left(\frac{2r}{R_o^2} + -\frac{2r}{R_i^2} + \frac{\left[1 - \left(\frac{R_i}{R_o}\right)^2\right]^2}{\ln\frac{R_o}{R_i}} \frac{1}{r}\right)$$

The hoop strain rate $\gamma_{r\theta}$ is calculated by the following formula:

$$\gamma_{r\theta} = \frac{\Omega_1 \left(\frac{1}{r^2} - \frac{1}{R_o}\right)}{\frac{1}{R_i^2} - \frac{1}{R_o^2}} \pm \frac{\Omega_2 \left(\frac{1}{R_i^2} + \frac{1}{r}\right)}{\frac{1}{R_i^2} - \frac{1}{R_o^2}}$$

The hoop strain force $\sigma_{r\theta}$ is calculated by the following formula:

$$\sigma_{r\theta} = \frac{M_1 \pm M_2}{2\pi r^2 l} = A_1(M_1 \pm M_2)/r^2$$

Among them,

Ro: Outer radius of the forming runner;
Ri: Inner radius of the forming runner;

r: Radius value at any position in the forming runner ween Ri and Ro);

L: Length of the forming runner;

Q: Extrusion flow, determined by measuring the quality of the extruded material for a certain period of time;

Ω1: Rotating speed of the die;

Ω2: Rotating speed of the mandrel;

3) Assuming that the power rate index is 1, the resultant strain force is G, the shear rate is γ and the shear viscosity η.

$$\sigma = \sqrt{\sigma_{r\theta}^2 + \sigma_{rz}^2}$$
$$\sigma = \sqrt{\gamma_{r\theta}^2 + \gamma_{rz}^2}$$
$$\eta = \frac{\sigma}{\gamma}$$

The final resultant strain force σ and resultant shear rate γ are the rheological parameters under the complex pressure/shear component field, which can provide a research basis and actual processing instructions for the rheological behavior and structure formation and evolution of polymers under complex pressure/shear component force fields.

Different from the situation of the prior technology, the beneficial effects of the present invention are:

1. Because the rheometer provided by the present invention can apply pressure and/or drag force to the polymer melt, so the polymers can not only produce three-dimensional component flow of pressure/drag, but also can be adjusted to produce a single flow of pressure or drag. Therefore, different rheological behaviors of polymers can be measured under different force fields such as pressure flow, drag flow, pressure/drag component flow, etc., which can not only achieve a breakthrough in polymer processing rheometry under complex processing conditions which has direct and effective theoretical guiding significance for the complex processing of polymers, and can also provide support for the study of simple rheological behavior of polymers.

2. Because the molding flow channel designed in the rheometer provided by present invention is a closed system, therefore, even if the mandrel and the die rotate in the same direction which lead to a higher rotation speed, the problem of edge fracture of the polymer melt under high rotation speed of the existing flat rheometer which will affect the test results will not occur.

3. Because the rheometer provided by the present invention is designed with an annular groove or thread structure in the buffer receiving section of the mandrel, it can increase the shear force to the melt material and increase the test range of the shear rate.

4. Because the rheometer provided by the present invention is aimed at the right-angle feeding method of the existing rotation extrusion processing device, which easily lead to uneven thickness of the polymer pipe wall. The feeding system is designed into a straight-through form, so that the material extruded by the melt extruder can directly enter the rotating extrusion rheological die along the flow channel, so that the uniformity of the pipe wall of the final product is improved.

5. Because the newly designed rheometer of the present invention can measure the pressure, torque and other key parameters of the polymer melt during rotation extrusion process simultaneously. A self-derived formula is also provided that the rheological behavior of the melt during the rotary extrusion process can be directly obtained. A major breakthrough has been achieved from processing equipment to processing equipment and scientific instruments.

6. Because the present invention can also prepare high-performance polymer microtubes while realizing the measurement of polymer processing rheology, the practicability of the rheometer is increased.

DETAILED DESCRIPTION

The technical solutions in the embodiments of the present invention will be clearly and completely described below in conjunction with the accompanying drawings in the embodiments of the present invention. Obviously, the described embodiments are only a part of the embodiments of the present invention, not all the embodiments. Based on the embodiments of the present invention, all other embodiments obtained by those ordinary technicians without creative work shall fall within the protection range of the present invention.

Example 1

This embodiment is an embodiment of the rotation extrusion processing rheometer capable of simultaneously measuring the pressure/shear rheology of polymers.

Figure 1:
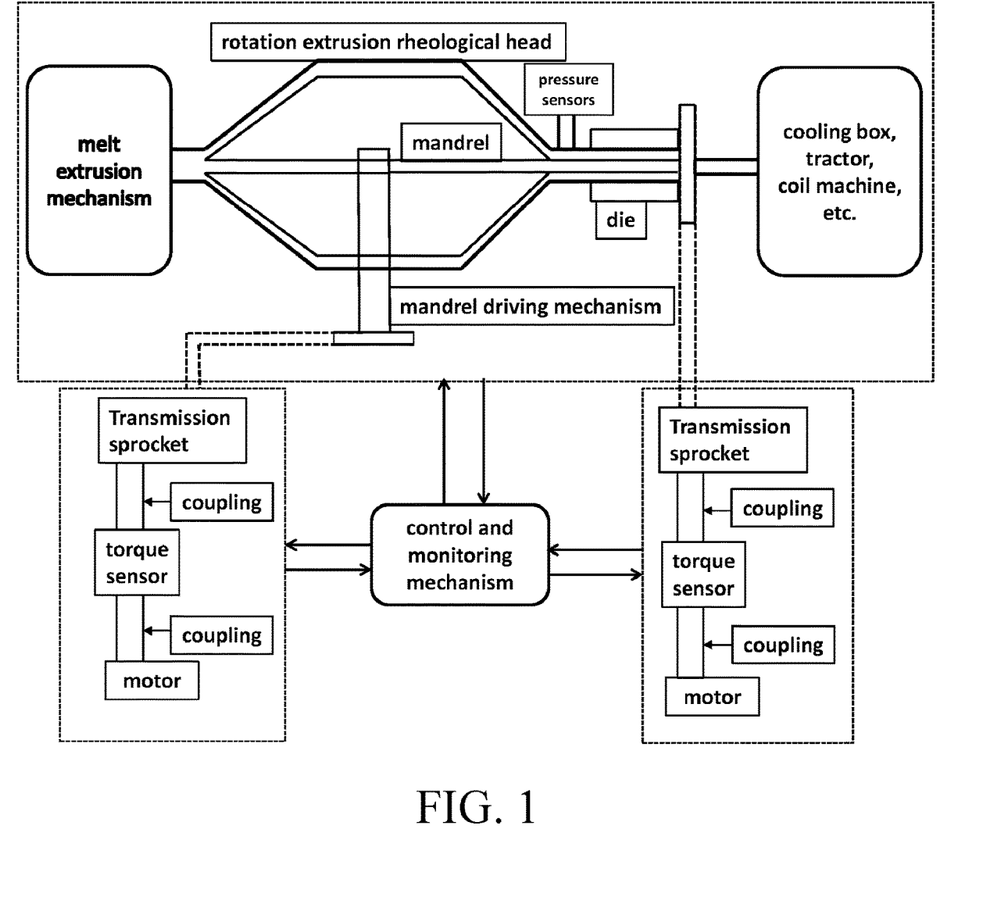
FIG. 1 is a schematic diagram of the structural connecting relationship of the rotary extrusion rheometer capable of simultaneously measuring polymer pressure/shear rheology according to an embodiment of the present invention.

The polymer rotation extrusion processing rheometer with rheological measurement function provided in this embodiment includes the melt extrusion mechanism, the rotation extrusion rheological head, and the sensor, the transmission sprocket, the coupling, motor, the control and monitoring institutions, the cooling boxes, the tractors and the tube coilers, etc. which are sequentially connected, as shown in FIG. 1. Among them, the rotation extrusion rheological head is composed of the connecting pipe fitting 1, the shunt bracket 3, the lower neck section 12, the machine head piece 15, the die 17, the die driving sprocket 20, the mandrel 21 and the mandrel driving mechanism. The connecting pipe fitting 1, the shunt bracket 3, and the machine head piece 15 are connected in order by a uniformly distributed connecting piece, such as the bolt 11 and the screw thread. The lower neck section 12 is located in the cavity between the shunt bracket 3 and the machine head piece 15. The die 17 is active fixed in the cavity at the rear end of the machine head piece 15, and is connected to the opening mold driving sprocket 20 outside the end face of the machine head piece 15. The mandrel 21 is located in the inner channel of the lower neck section 12, the machine head piece 15 and the die 17, with one end connected to the mandrel driving mechanism in the shunt bracket 3. The sensors are divided into pressure sensor and torque sensor. The sensor is installed in the stepped through hole 16 on the side of the machine head piece 15, and the torque sensor is installed on the coupling between the transmission sprocket and the motor. Both sensors are connected to the control and monitoring mechanism The cooling box, the tractor, the coil machines and other equipment are connected outside the die 17 in sequence.

Figure 2:
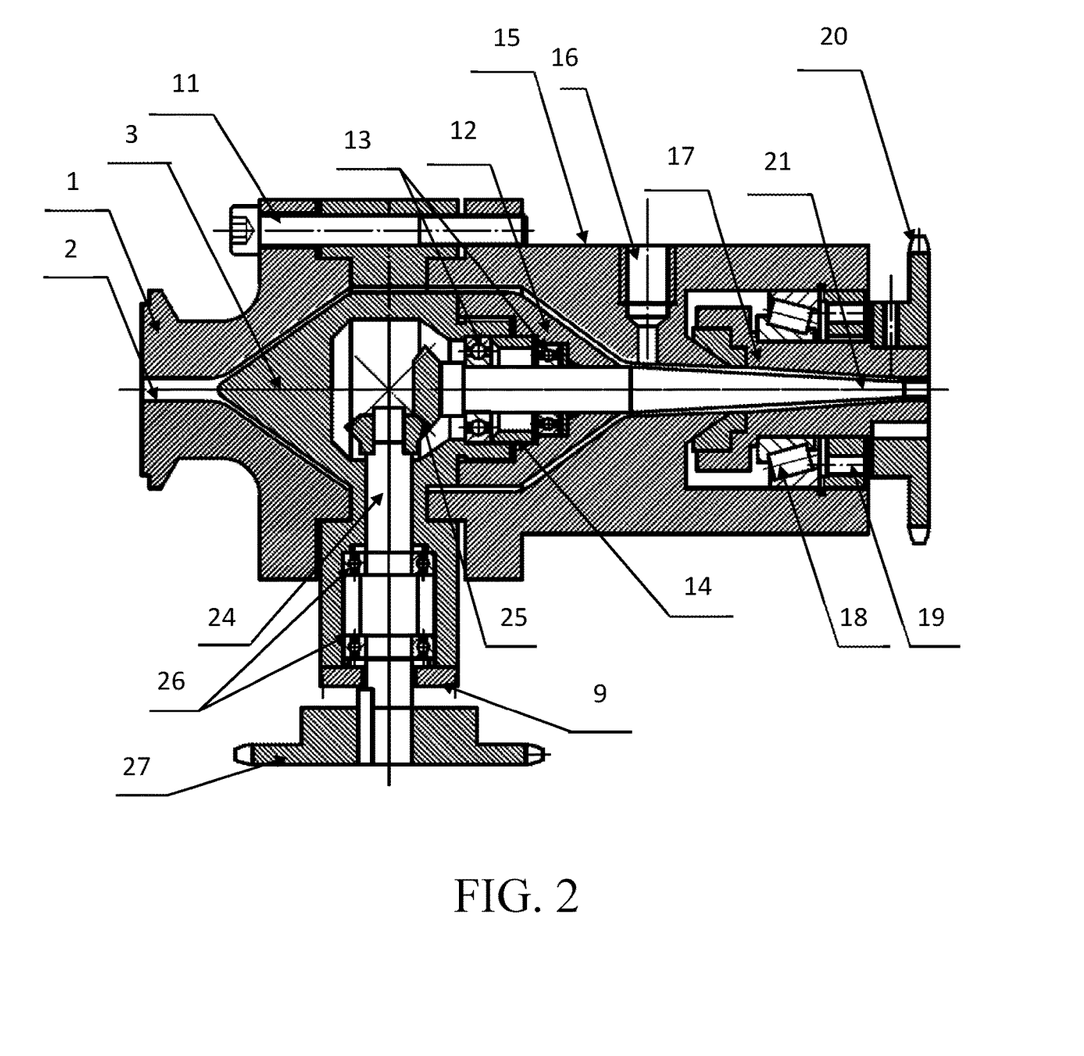
FIG. 2 is a cross-sectional structure diagram of the rotation extrusion rheometer head in the rotation extrusion rheometer capable of simultaneously measuring polymer pressure/shear rheology according to an embodiment of the present invention.

The cross-sectional shape of the connecting pipe fitting 1 is an inverted "convex" shape, the left and right ends are both flange plates, and the middle of the left plate surface connected to the melt extrusion mechanism is opened with a melt feeding through hole 2 The melt feeding through hole 2 and the mandrel 21 are located on the same center line, and the rear half of the feed through hole 2 is an open cavity with a bell mouth to match the conical protrusion at one end of the shunt bracket 3, as shown in FIG. 2.

Figure 3:
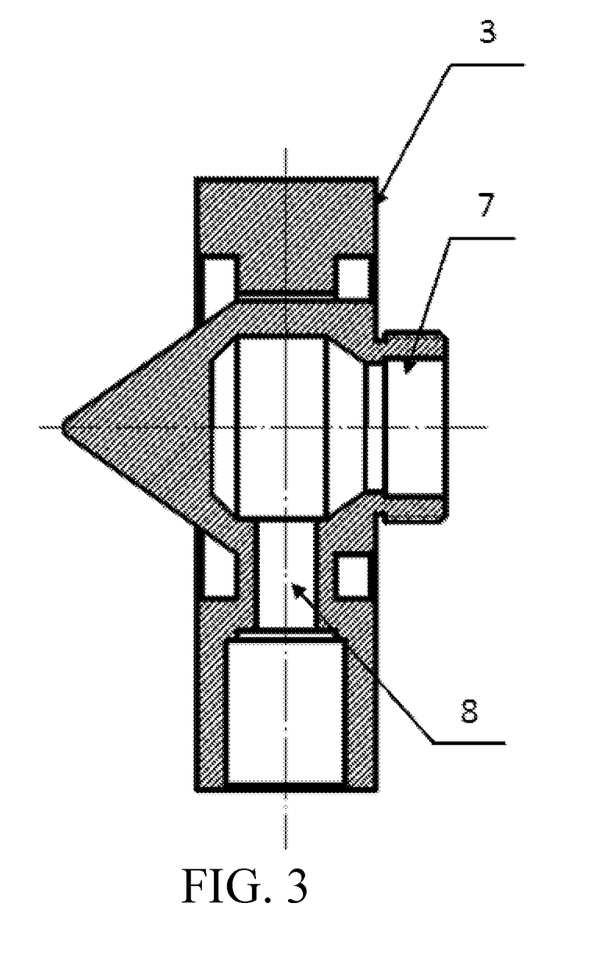
FIG. 3 is a schematic cross-sectional structure diagram of the shunt bracket in the rotation extrusion rheometer head of the rotation extrusion rheometer capable of simultaneously measuring polymer pressure/shear rheology according to an embodiment of the present invention.
Figure 4:
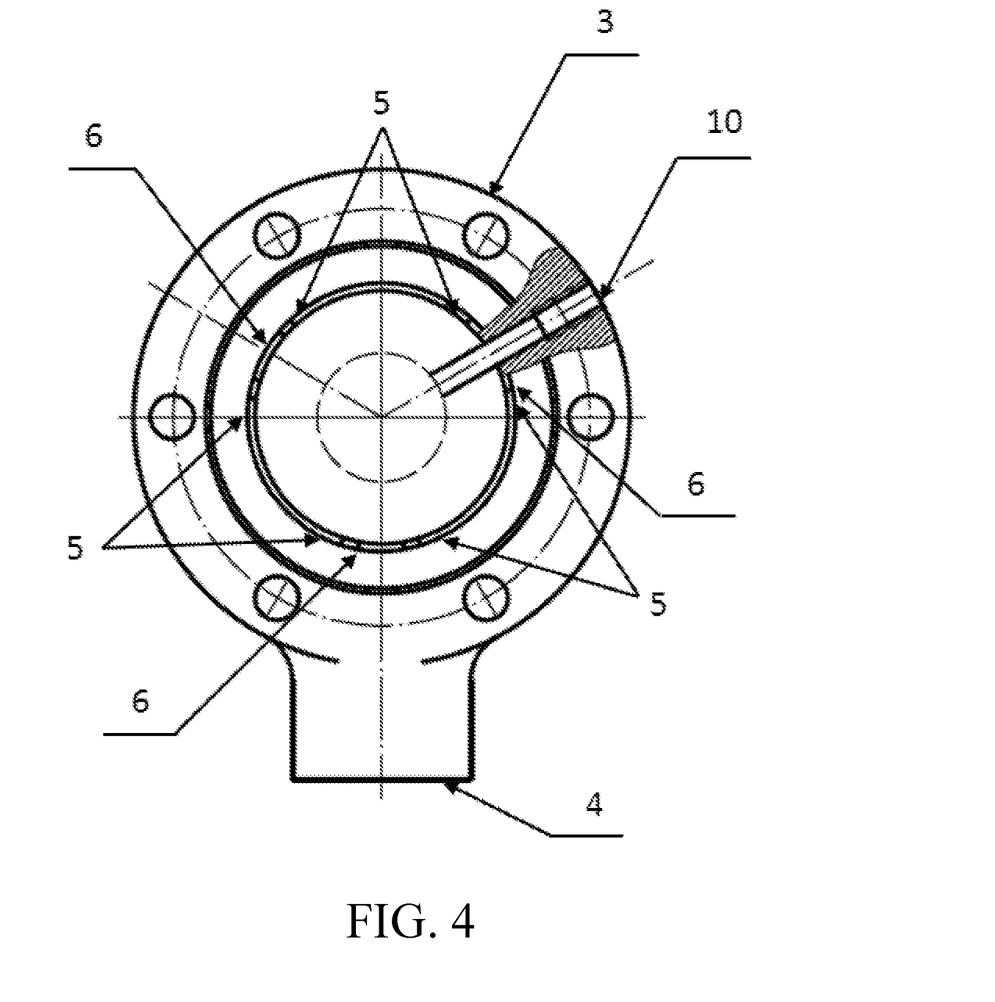
FIG. 4 is a schematic left view of the structure of FIG. 3.

The front section of the frame of shunt bracket 3 is an inverted conical protrusion, and the middle section of the frame has a flange plate extending outward along the bottom edge of the inverted conical protrusion which is matched and connected with the connecting pipe fitting and the machine head piece. The side of the frame between the flange plate surfaces extends downward to form a column 4, the outer diameter of the rear frame is smaller than the outer diameter of the middle frame and matches with the inner diameter of the stepped through hole at the front end of the lower neck section. The outer surface of the inverted cone-shaped protrusion is provided with an arc-shaped "concave" trough melt material flow channel 15. In this embodiment, there are three arc-shaped "concave" trough melt material flow channels that are s, and the melt material flow channels 5 extend to the end of the middle section frame, and the width of the feeding end is greater than the width of the discharging end. Every two arc-shaped "concave" trough melt material flow channels 5 are separated by a convex reinforce 6. A stepped blind hole 7 is horizontally opened in the middle and rear section of the frame of shunt bracket 3, and the cavity on the side of the blind end is used as the transmission chamber where the arc gear 25 is located which meshed in the mandrel driving mechanism. A stepped through hole 8 is opened in the column 4 extending below the middle section of the frame. The stepped through hole 8 is vertically connected to the blind end of the stepped blind hole 7, and the other end is sealed by a cover plate 9 with a hole. In addition, a vent hole 10 is also opened on the middle section of the frame of the rib on the upper side. The vent hole 10 is also connected with the blind end of the stepped blind hole 7, so that the pressured gas is allowed to enter the axial vent hole 23 opened in the mandrel 21 to reach the microtube at the end of the outlet die 17. On the one hand, it can cool down the newly extruded pipe, and on the other hand, it can prevent the melt collapse of the newly extruded pipe. As shown in FIG. 2-4.

The shape of the lower neck section 12 likes a columnar cone with a stepped through hole inside. After the rear section of the shunt bracket is matched with the stepped through hole, a pair of bearings 13 and a separation washer 14 are placed in it. Shown in FIG. 2.

The machine head piece 15 is a cylinder, one end of which is a flange plate connected to the shunt bracket 3. The front and middle sections of the cylinder are provided with a cylindrical funnel-shaped open cavity along the axial direction. The machine neck section 12 is matched with the cavity and placed in it. A gap is left between lower machine neck 12 and the inner wall of the cavity to serve as a flow channel behind the frame of shunt 3 for the melt. A stepped through hole 16, in which a pressure sensor is arranged, is vertically opened on the cylinder on the side of the starting end of the funnel cavity nozzle. A cylindrical open cavity is opened along the axial direction in the cylinder at the rear of the stepped through hole 16. There is a convex cone at the bottom of the cavity and the axial through hole in the cone is an extension of the funnel-shaped cavity nozzle. The middle of funnel-shaped cavity and inner wall of its extension are matched with the first half of conical section of the working section of the mandrel 21, There is also a gap between them to serve as the melt flow channel connected to the lower neck section 12. See FIG. 2.

The die 17 is an inverted "T"-shaped cylindrical body with a "T"-shaped stepped through hole along axial direction. This cylindrical body is movably fixed in the cylindrical open space of the machine head piece 15 by a tapered roller bearing 18 and a nut 19. The die 17 is matched with the tapper second half of the working section and the straight section of the mandrel 21. There is also a gap between them to serve as a flow channel for the melt connected to the machine head piece 15. See FIG. 2.

The die driving sprocket 20 is connected with transmission sprocket, coupling and motor through a chain.

Figure 5:
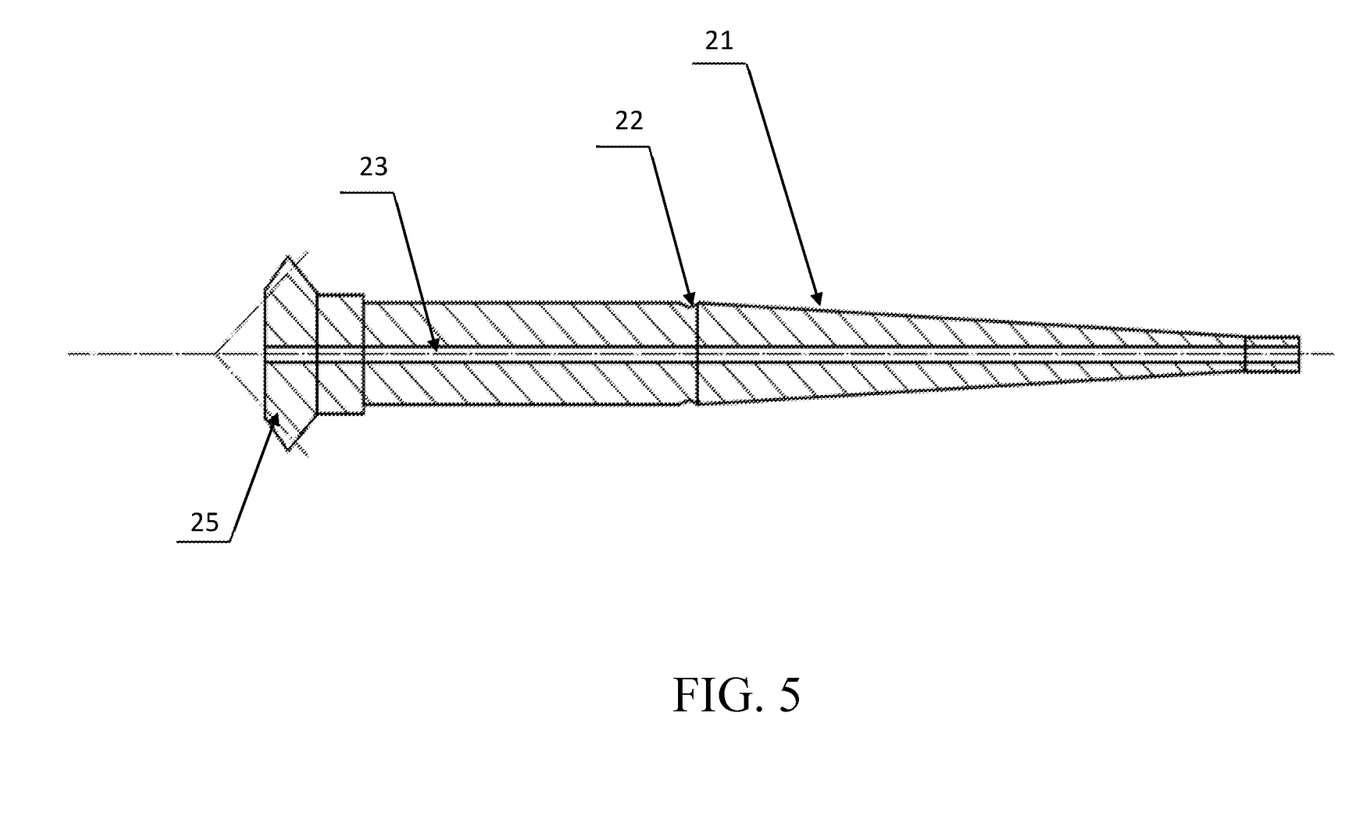
FIG. 5 is a schematic cross-sectional structure diagram of the mandrel in the rotation extrusion rheological head of the rotation extrusion rheometer capable of simultaneously measuring polymer pressure/shear rheology according to an embodiment of the present invention.

The mandrel 21 is a glossy bar, which is formed by a supporting movably fixed section and a working section. The supporting movably fixed section is movably supporting fixed by axletree 13, formed in the stepped cavity between the shunt bracket 3 and the lower machine neck 12. This makes the working section cantilever locate in the stepped through hole of the funnel nozzle of the machine head piece 15 and the die 17. The working section is composed of a conical section and a straight section and the length ratio of the conical section to the straight section is at least 11:1. An annular groove 22 is opened at the junction of the supporting movable fixed section and the working section in this example. In addition, an axial vent hole 23 is opened along the mandrel 21. See FIG. 2 and FIG. 5.

The mandrel driving system is composed of driving rod of the core bar 24, bevel gear 25 and a bearing 26. The driving rod of the core bar 24 is in turn to cross through the stepped through hole 8 of the column 4 under the middle section of the shunt bracket 9 and the through hole cover 9. The driving rod of the core bar 24 is movably supported and fixed by the bearing 26 which is located in the stepped through hole so that the upper end of the driving rod is located in the blind end cavity of the middle section of the shunt bracket 3 and the lower end is located outside the nether column 4 to connect with the mandrel drive sprocket 27. There are two bevel gears 25. One is installed on supporting active fixed segment of the mandrel 21 in the middle cavity of the shunt bracket 3. The other is geared with the mandrel and installed on top end of one end of driving rod of the core bar 24, located in the middle cavity of the shunt bracket 3. See FIG. 2.

The mandrel driving sprocket is connected with the transmission sprocket, the coupling and a motor.

A first end of the mandrel (21) is rotatably connected to a first end of a driving rod (24), and a second end of the driving rod (24) is connected to a mandrel driving sprocket (27), wherein the mandrel driving sprocket (27) is connected to a first motor through a first coupling, positioned between the mandrel driving sprocket (27) and the first motor, and a first torque sensor is installed on the first coupling, and further, the die driving sprocket (20) is connected to a second motor through a second coupling, positioned between the die driving sprocket (20) and the second motor, and a second torque sensor is installed on the second coupling. See FIG. 2.

The polymer used in this example is random copolymer polypropylene (PPR), trade name of which is RP200. The manufacturer is South Korea's Samsung Chemical. The relevant parameters of the extrusion rheometer are listed: $R_o=0.003$ m, $R_i=0.002$ m, $r=R_o=0.003$ m, L=0.074 m; The setting conditions and tested are listed: temperature 230° C.; pressure value $\Delta P=1.05$ MPa; die speed $\Omega 1=10$ rpm=1.04 rad/s; mandrel speed $\Omega 2=0$; $Q=1.66*10^{-8}$ m³/s, calculated by the following formulas:

Axial Shearing Stress:

$$\sigma_{rz} = \frac{\Delta P R_0^2}{4L}\left(-\frac{2r}{R_0^2} + -\frac{2r}{R_0^2} + \frac{\left[1-\left(\frac{R_i}{R_0}\right)^2\right]^2}{\ln\frac{R_0}{R_i}}\frac{1}{r}\right) = 6703 \text{ Pa}$$

Axial Shearing Rate:

$$\gamma_{rz} = \frac{2Q}{\Pi R^2\left[1-\left(\frac{R_i}{R_0}\right)^4 - \frac{\left[1-\left(\frac{R_i}{R_0}\right)^2\right]^2}{\ln\frac{R_0}{R_i}}\right]}\left(-\frac{2r}{R_0^2} + \frac{\left[1-\left(\frac{R_i}{R_0}\right)^2\right]^2}{\ln\frac{R_0}{R_i}}\frac{1}{r}\right) = 5.97 s^{-1}$$

Hoop Shearing Stress:

$$\sigma_{r\delta} = \frac{M_1}{2\Pi r^2 L} = 6702 \text{Pa}$$

Hoop Shearing Rate:

$$\gamma_{r\delta} = \frac{\Omega_1\left(\frac{1}{r^2}-\frac{1}{R_0}\right)}{\frac{1}{R_i^2}-\frac{1}{R_0}} = 2.72 s^{-1}$$

Combine Shearing Rate:

$$\sigma = \sqrt{\sigma_{rz}^2+\sigma_{r\delta}^2} = 36484.8 \text{ Pa}$$

Melt Viscosity:

$$\eta = \frac{\sigma}{\gamma} = 5555.4 \text{Pa}\cdot s$$

The outer diameter of the PPR microtubes, prepared under only pressure flow; is about 3 mm and the wall thickness is approximately 0.5 mm. The hoop torsional strength of is 16 MPa and the torsional modulus is 383.5 MPa.

Example 3

This example is a rheological measurement method capable of simultaneously measuring the pressure and shearing rheology of a polymer.

The polymer used in this example is random copolymer polypropylene (PPR), trade name of which is RP200. The manufacturer is South Korea's Samsung Chemical. The relevant parameters of the extrusion rheometer are listed: $R_o=0.003$ m, $R_i=0.002$ m, $r=R_o=0.003$ m, L=0.074 m; The setting conditions and tested are listed: temperature 230° C.; pressure value $\Delta P=3.78$ MPa. Die and mandrel rotate in the same direction, mandrel rotating speed $\Omega_1=40$ rpm=4.18 rad/s, the mandrel torque is $M_1=0.14$N·M; the die rotating speed $\Omega_2=40$ rpm=4.18 rad/s, the die torque $M_2=0.12$N·M; $Q=2.18*10^{-8}$ m³/s. These were calculated by the following formula:

Axial Shearing Stress:

$$\sigma_{rz} = \frac{\Delta P R_0^2}{4L}\left(-\frac{2r}{R_0^2} + -\frac{2r}{R_0^2} + \frac{\left[1-\left(\frac{R_i}{R_0}\right)^2\right]^2}{\ln\frac{R_0}{R_i}}\frac{1}{r}\right) = 2.77\times 10^4 \text{Pa}$$

Axial Shearing Rate:

$$\gamma_{\gamma z} = \frac{2Q}{\Pi R^2\left[1-\left(\frac{R_i}{R_0}\right)^4 - \frac{\left[1-\left(\frac{R_i}{R_0}\right)^2\right]^2}{\ln\frac{R_0}{R_i}}\right]}\left(-\frac{2r}{R_0^2} + \frac{\left[1-\left(\frac{R_i}{R_0}\right)^2\right]^2}{\ln\frac{R_0}{R_i}}\frac{1}{r}\right) = 3.29 s^{-1}$$

Hoop Shearing Stress:

$$\sigma_{r\theta} = \frac{M_1}{2\Pi R_i^2 L} + \frac{M_2}{2\Pi R_0^2 L} = 3.31\times 10^4 \text{Pa}$$

Hoop Shearing Rate:

$$\gamma_{r\theta} = \frac{\Omega_1\left(\frac{1}{r^2}-\frac{1}{R_0}\right)}{\frac{1}{R_i^2}-\frac{1}{R_0}} + \frac{\Omega_2\left(\frac{1}{r}+\frac{1}{R_i^2}\right)}{\frac{1}{R_i^2}-\frac{1}{R_0}} = 3.14 s^{-1}$$

Combined Shearing Stress:

$$\sigma = \sqrt{\sigma_{rz}^2+\sigma_{r\theta}^2} = 4.32\times 10^4 \text{ Pa}$$

Combined Shearing Rate:

$$\gamma = \sqrt{\gamma_{rz}^2+\gamma r\theta^2} = 4.55 s^{-1}$$

Melt Viscosity:

$$\eta = \frac{\sigma}{\gamma} = 9.55\times 10^3 \text{Pa}\cdot s$$

The PPR microtubes prepared under pressure/shear compound flow are characterized by an outer diameter of about 3 mm, a wall thickness of about 0.5 mm, a hoop torsional strength of 18.5 MPa and a torsional modulus of 457.8 MPa.

The above mentioned example is only an example in this invention and not limit the scope of the present invention. Any equivalent structure or equivalent process transformation made by using the contents of the description and drawings of the present invention, or directly or indirectly applied to other related technologies in the same way, all are included in the scope of patent protection of the present invention.

The invention claimed is:

1. A rotation extrusion processing rheometer, comprising: an extruder connected to a rotation extrusion rheometer machine head, wherein the rotation extrusion rheometer machine head comprises a connecting pipes (1), a shunt bracket (3), a lower neck section (12), a machine head piece (15), a die (17), a die driving sprocket (20), and a mandrel (21), wherein the connecting pipe piece (1), the shunt bracket (3), and the machine head piece (15) are connected, wherein the lower neck section (12) is disposed in a first cavity between the shunt bracket (3) and the machine head piece (15), wherein the die (17) is movably disposed in a second cavity in the machine head piece (15) and is connected with the die driving sprocket (20) disposed outside an end face of the machine head piece (15), wherein the mandrel (21) is located in a channel extends through the lower neck section (12), the machine head piece (15), the die (17), and the die driving sprocket (20), a first end of the mandrel (21) extends into a third cavity disposed inside the shunt bracket (3) and is rotatably connected to a first end of a driving rod (24), wherein a second end of the driving rod (24) is connected to a mandrel driving sprocket (27), wherein the mandrel driving sprocket (27) is connected to a first motor through a first coupling, positioned between the mandrel driving sprocket (27) and the first motor, and a first torque sensor is installed on the first coupling, and wherein the die driving sprocket (20) is connected to a second motor through a second coupling, positioned between the die driving sprocket (20) and the second motor, and a second torque sensor is installed on the second coupling.

2. The rotation extrusion processing rheometer according to claim 1, wherein the connecting pipe piece (1) has a concave end surface is disposed adjacent to a front portion of the shunt bracket (3).

3. The rotation extrusion processing rheometer according to claim 1, wherein a concave end surface of the machine head piece (15) is disposed adjacent to a back portion of the lower neck section (12).

4. The rotation extrusion processing rheometer according to claim 1, wherein the lower neck section (12) is in a shape of cylindrical cone with a stepped through hole disposed therein.

5. The rotation extrusion processing rheometer according to claim 1, wherein the die (17) has a through hole in an axial direction and is supported by a tapered bearing 18 and a nut 19.

6. The rotation extrusion processing rheometer according to claim 5, wherein the mandrel (21) has a supporting movable fixed section and a working section,
wherein the supporting movable fixed section is rotatably supported by an axletree (13) disposed in a fourth cavity disposed between the shunt bracket (3) and the lower machine neck (12), and
wherein the working section extends through the through hole in the die (17), and comprises a conical section and a straight section, wherein a length ratio of the conical section to the straight section is at least 11:1.

7. The rotation extrusion processing rheometer according to claim 1, wherein a first bevel gear (25) is installed at the first end of the driving rod (24) and meshes with a second bevel gear (25) installed at the first end of the mandrel (21), wherein the driving rod (24) is supported by a bearing (26) disposed in the first cavity disposed inside the shunt bracket (3).

8. The rotation extrusion processing rheometer according to claim 2, wherein a channel extends through the machine head piece (15), comprising a through hole in the connecting pipe piece (1), a space between the concave end surface of the connecting pipe piece (1) and the front portion of the shunt bracket (3), a space between the concave end surface of the machine head piece (15) and the lower neck section (12), a space between the mandrel (12) and the die (17), wherein the channel is connected to the extruder and configured to form a passage to allow a molten material to pass through.

* * * * *